US011500605B2

(12) United States Patent
Chang et al.

(10) Patent No.: US 11,500,605 B2
(45) Date of Patent: Nov. 15, 2022

(54) IMAGE TRANSMISSION DEVICE, IMAGE DISPLAY SYSTEM CAPABLE OF REMOTE SCREENSHOT, AND REMOTE SCREENSHOT METHOD

(71) Applicant: AVER INFORMATION INC., New Taipei (TW)

(72) Inventors: Han-Yen Chang, New Taipei (TW); Ming Kang Chuang, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 0 days.

(21) Appl. No.: 17/023,263

(22) Filed: Sep. 16, 2020

(65) Prior Publication Data
US 2021/0081160 A1  Mar. 18, 2021

(30) Foreign Application Priority Data
Sep. 17, 2019  (TW) ................................ 108133450

(51) Int. Cl.
*G06F 3/14*    (2006.01)
*G09G 5/14*    (2006.01)
*G09G 5/377*   (2006.01)

(52) U.S. Cl.
CPC ............. *G06F 3/1454* (2013.01); *G09G 5/14* (2013.01); *G09G 5/377* (2013.01); *G09G 2340/02* (2013.01); *G09G 2370/16* (2013.01); *G09G 2370/20* (2013.01)

(58) Field of Classification Search
None
See application file for complete search history.

(56) References Cited

U.S. PATENT DOCUMENTS

| 2004/0130568 | A1* | 7/2004 | Nagano ............ H04N 21/64792 |
| | | | 715/733 |
| 2017/0031947 | A1* | 2/2017 | Venkataraman ...... G06F 3/0488 |
| 2018/0285053 | A1* | 10/2018 | Fang ......................... G06F 9/44 |
| 2020/0272404 | A1* | 8/2020 | Mu ..................... G06F 3/04883 |
| 2021/0034793 | A1* | 2/2021 | Wang .................. G06F 21/6254 |

FOREIGN PATENT DOCUMENTS

| AU | 2016200976 A1 * | 3/2016 | ......... H04L 12/2836 |
| GB | 2526618 A * | 12/2015 | ......... H04N 21/2343 |
| WO | WO-2019183984 A1 * | 10/2019 | ............. G06F 21/60 |

* cited by examiner

*Primary Examiner* — Patrick F Valdez
(74) *Attorney, Agent, or Firm* — Maschoff Brennan

(57) ABSTRACT

A remote screenshot method adapted to a sender and a receiver having a communicable connection with the sender, wherein the sender electrically connects to an electronic device to receive an image signal outputted by the electronic device, the receiver electrically connects to a display device to show the image signal, and the remote screenshot method comprises: sending a capturing instruction through a first communication circuit by the sender; receiving the capturing instruction through a second communication circuit by the receiver; obtaining a captured image according to the capturing instruction by the sender, wherein the captured image is associated with the image signal shown by the display device; sending the captured image to the first communication circuit through the second communication circuit by the receiver; and storing the captured image in a storage circuit by the sender.

4 Claims, 4 Drawing Sheets

IMAGE TRANSMISSION DEVICE, IMAGE DISPLAY SYSTEM CAPABLE OF REMOTE SCREENSHOT, AND REMOTE SCREENSHOT METHOD

CROSS-REFERENCE TO RELATED APPLICATIONS

This non-provisional application claims priority under 35 U.S.C. § 119(a) on Patent Application No(s). 108133450 filed in Taiwan on Sep. 17, 2019, the entire contents of which are hereby incorporated by reference.

BACKGROUND

1. Technical Field

The present disclosure relates to an image display system, and more particularly to the image display system capable of remote screenshot, an image transmission device, and a remote screenshot method.

2. Related Art

Wireless projection technique may reduce cables connecting respectively from multiple computers to a projector. In the meeting adopting the wireless projection, participants first connect senders of the wireless projection devices to their own computers, and then these senders transmit images displayed by local monitors of participants to a receiver of the wireless projection device. The receiver may integrate images of multiple participants and show on a display panel in a form of multiple windows.

In general, wireless projection products on the market only have a signal-way image projection function. When the participant captures an image of the screen for conference record, the captured image would not contain the multi-window information shown on the receiver. Furthermore, when the receiver is an Interactive Flat Panel (IFP), the captured image may not include annotations marked via the screen by other participants. Under such scenario, the participant may have to move to the receiver, operate the receiver to capture an image of the multi-window as well as the annotations, and store this captured image. For example, the participant may plug the USB drive into the receiver and perform some operations to store the file in the USB drive. However, the above steps may not only be inconvenient but also interfere the proceeding of the conference.

SUMMARY

In view of the above, the present disclosure proposes an image transmission device, an image display system capable of remote screenshot and a remote screenshot method. The user can make a complete conference record or capture an image of the multi-window shown on the receiver at his own computer without moving to the receiver. Therefore, the required information can be recorded on the local site without interfering the conference.

According to an embodiment of the present disclosure, a remote screenshot method adapted to a sender and a receiver having a communicable connection with the sender, wherein the sender electrically connects to an electronic device to receive an image signal outputted by the electronic device, the receiver electrically connects to a display device to show the image signal, and the remote screenshot method comprises: sending a capturing instruction through a first communication circuit by the sender; receiving the capturing instruction through a second communication circuit by the receiver; obtaining a captured image according to the capturing instruction by the sender, wherein the captured image is associated with the image signal shown by the display device; sending the captured image to the first communication circuit through the second communication circuit by the receiver; and storing the captured image in a storage circuit by the sender.

According to an embodiment of the present disclosure, an image transmission device adapted to electrically connect to an electronic device and a display device comprising: a sender and a receiver. The sender comprises a trigger circuit, a first communication circuit, and a storage circuit. The trigger circuit is configured to generate a capturing instruction. The first communication circuit electrically connects to the trigger circuit and sends an image signal outputted by the electronic device, sends the capturing instruction and receives a captured image. The storage circuit is configured to store the image signal and has a transmission interface configured to electrically connect to the electronic device to transmit the captured image. The receiver comprises a second communication circuit, an image buffer, and a control circuit. The second communication circuit communicably connects to the first communication circuit and is configured to receive the image signal, receive the capturing instruction and send the captured image. The image buffer electrically connects to the second communication circuit and is configured to temporarily store the image signal shown by the display device. The control circuit electrically connects to the second communication circuit and the image buffer and is configured to obtain the captured image from the image buffer according to the capturing instruction and control the second communication circuit to send the captured image.

According to an embodiment of the present disclosure, an image display system capable of remote screenshot comprises an electronic device, a display device and an image signal transmission device as previously described. The electronic device outputs an image signal. The display device has a display panel showing an image of the screen, with the image of the screen being associated with the image signal. The image signal transmission device electrically connects to the electronic device and the display device.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
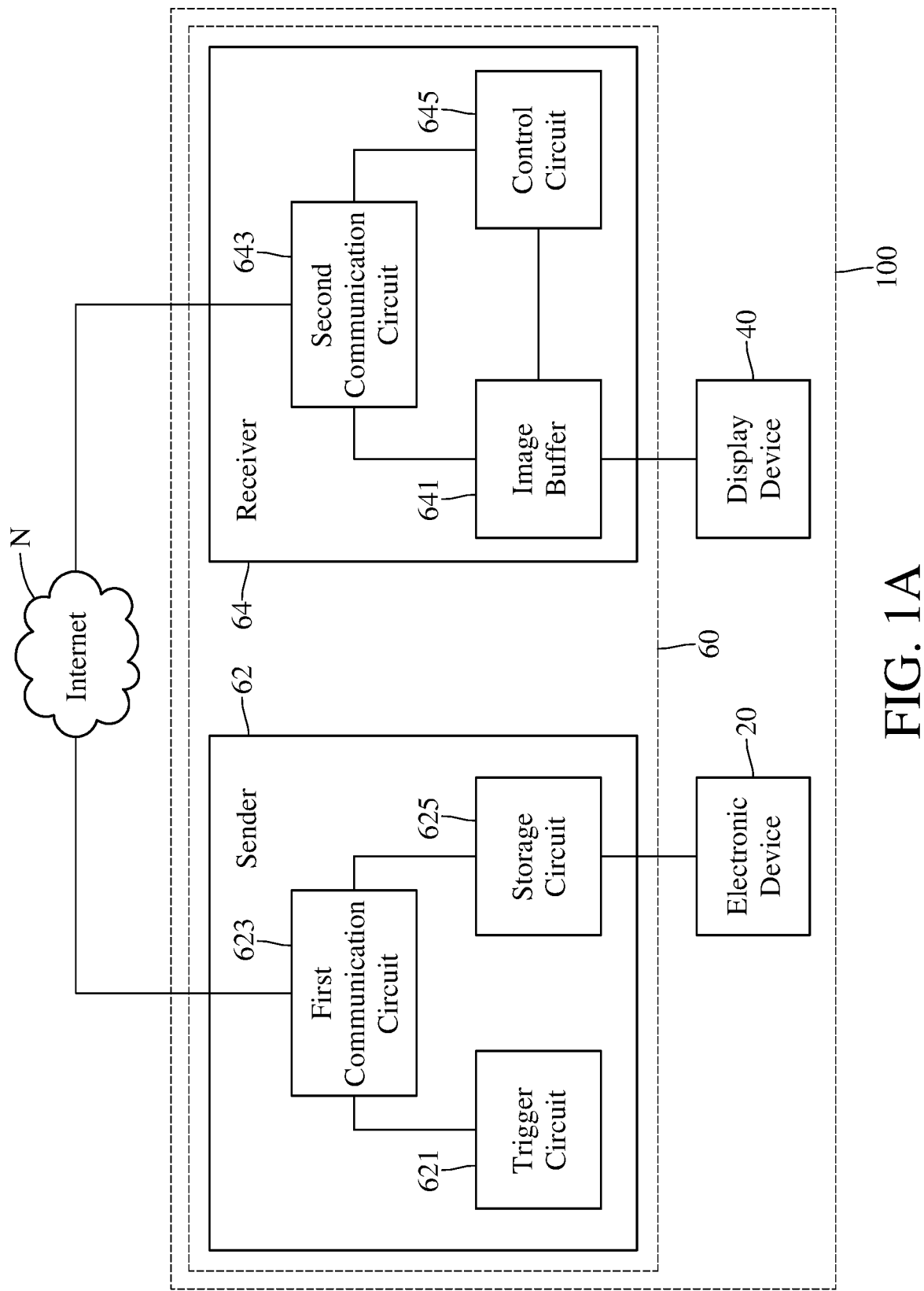
FIG. 1A is a block diagram of the image display system capable of remote screenshot according to an embodiment of the present disclosure.

Please refer to FIG. 1A, which illustrates a block diagram of the image display system 100 capable of remote screenshot according to an embodiment of the present disclosure. The image display system 100 capable of remote screenshot comprises the electronic device 20, the display device 40, and the image transmission device 60. As shown in FIG. 1A, the image transmission device 60 electrically connects to the electronic device 20 and the display device 40.

The electronic device 20 may output the image signal. In practice, the electronic device 20 is, for example, a personal computer, a laptop, a tablet computer, or a smartphone, and the present disclosure does not limit the hardware type of the electronic device 20. In another embedment, the image display system 100 capable of remote screenshot of the present disclosure comprises a plurality of electronic device 20, for example, the first electronic device outputting the first image signal and the second electronic device outputting the second image signal.

The display device 40 comprises a display panel to show an image related to the image signal. Practically, the participant may use a touch panel to make an annotation via the screen onto the image. In another embodiment, the display device 40 of the image display system 100 of the present disclosure comprises an input circuit, and the input circuit may generate an annotation layer attached to the image.

The image transmission device 60 comprises the sender 62 and the receiver 64. As shown in FIG. 1A, the sender 62 communicably connects to the receiver 64 through the internet N. The sender 62 may transmit the image signal outputted by the electronic device 20 to the receiver 64 through the internet N. The receiver 64 integrates this image signal with other image signals (under the condition that the receiver 64 communicably connect other senders except for the sender 62, and every sender connects to an electronic device respectively), and shows a composite image by the display device 40. In general, an example of the composite image is to show the images of the screens of all senders in a form with multi-window. Another example of the composite image is to show the at least one image of the screen of at least one sender in a form with at least one window.

Please refer to FIG. 1A. The sender 62 comprises the trigger circuit 621, the first communication circuit 623, and the storage circuit 625, wherein the first communication circuit 623 electrically connects to the trigger circuit 621 and the storage circuit 625. The sender 62 is implemented with, for example, a computer dongle, which connects to the electronic device 20 through a USB type-C interface or other hardware interface.

The trigger circuit 621 is configured to be triggered by the user to generate a capturing instruction. In an embodiment, the trigger circuit 621 is, for example, a button or a switch. In another embodiment, the trigger circuit 621 is configured to be triggered by the electronic device 20 to generate the capturing instruction. In other words, the user may generate the capturing instruction by operating on the electronic device 20 (such as pressing the key of the keyboard or clicking the mouse) or operating on the trigger circuit 621 of the sender 62.

The first communication circuit 623 may transmit the image signal outputted by the electronic device 20, transmit the capturing instruction, and receive the captured image. The captured image is returned by the receiver 64. The captured image will be described in detail in the following paragraphs.

The storage circuit 625 may store the captured image. The storage circuit 625 comprises a transmission interface electrically connecting to the electronic device 20, so that the sender 62 may transmit the captured image to the electronic device 20. Practically, the storage circuit 625 is, for example, the flash memory, and the present disclosure does not limit the hardware type of the storage circuit 625 nor the storage size.

The receiver 64 comprises the image buffer 641, the control circuit 645, and the second communication circuit 643, wherein the second communication circuit 643 electrically connects to the control circuit 645 and the image buffer 641 and the control circuit 645 electrically connects to the image buffer 641. The receiver 64 communicably connects to the first communication circuit 623 of the sender 62 through the second communication circuit 643. The second communication circuit 643 is configured to receive the image signal, receive the capturing instruction, and send the captured image. In an embodiment, the receiver 64 is, for example, an Open Pluggable Specification (OPS), a smart box, or an Interactive Flat Panel (IFP). In another embodiment, both the receiver 64 and the display device 40 may be integrated into a single device able to output images, such as the IFP.

The image buffer 641 is configured to temporarily store the image signal shown by the display device 40. The image signal represents the image currently shown by the screen of the display device 40. The image signal is, for example, a single image or a composite image. The single image is the image outputted by a single electronic device 20. The composite image is of a multi-window form that the images from a plurality of electronic device 20 respectively occupy a plurality of windows, or at least one window shows at least one (that is chosen by the user) of the images from the plurality of electronic devices 20, or an image along with an annotation layer. By the input circuit, the annotation layer is attached onto the image signal shown by the display device 40.

The control circuit 645 obtains the captured image from the image signal stored in the image buffer 641 and controls the second communication circuit 643 to send the captured image according to the capturing instruction. The control circuit 645 may further update the image signal temporarily stored in the image buffer 641 according to the annotation layer.

Figure 1B:
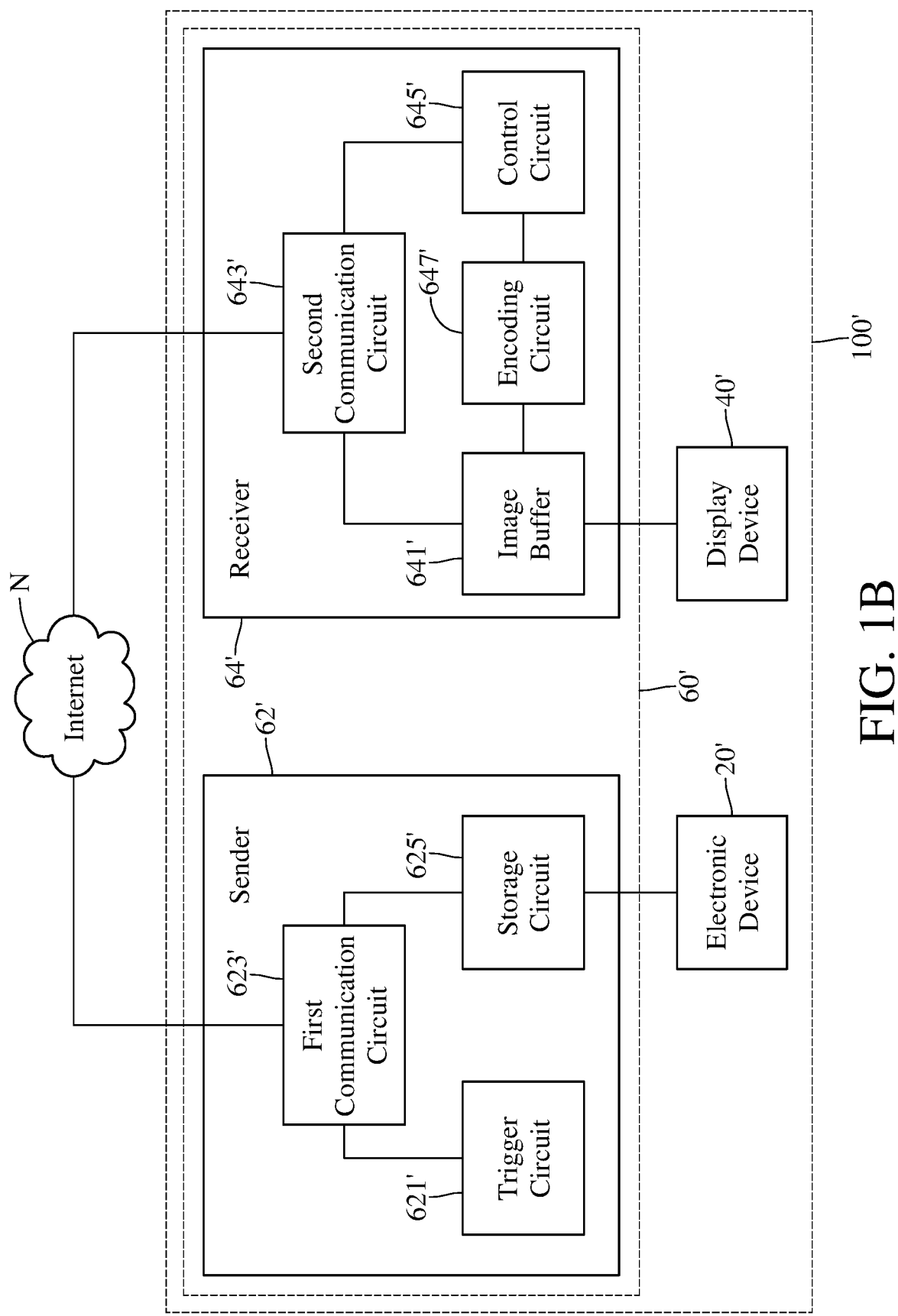
FIG. 1B is a block diagram of the image display system capable of remote screenshot according to another embodiment of the present disclosure.

Please refer to FIG. 1B, which illustrates a block diagram of the image display system 100' capable of remote screenshot according to another embodiment of the present disclosure. Compared to the receiver 64 of the image display system 100 of previous embodiment, the receiver 64' of the image display system 100' of this embodiment further comprises the encoding circuit 647'. The encoding circuit 647' electrically connects to the image buffer 641' and the control circuit 645'. The encoding circuit 647' converts the first file format of the captured image into the second file format, wherein the size of the captured image of the second file format is smaller than that of the first file format. Therefore, the internet bandwidth occupied by the captured image may reduce, and the transmission speed of the captured image may increase. In this embodiment, the control circuit 645' controls the second communication circuit 643' to send the captured image with the second file format. For example, the encoding circuit 647' is the codec, the first file format is RAW image format, the second file format is Joint Photographic Experts Group (JPEG) or Portable Network Graphics (PNG).

It should be notices that the captured image is a picture, a video, or a picture stream collection. The present disclosure does not limit the form of the captured image.

Figure 2:
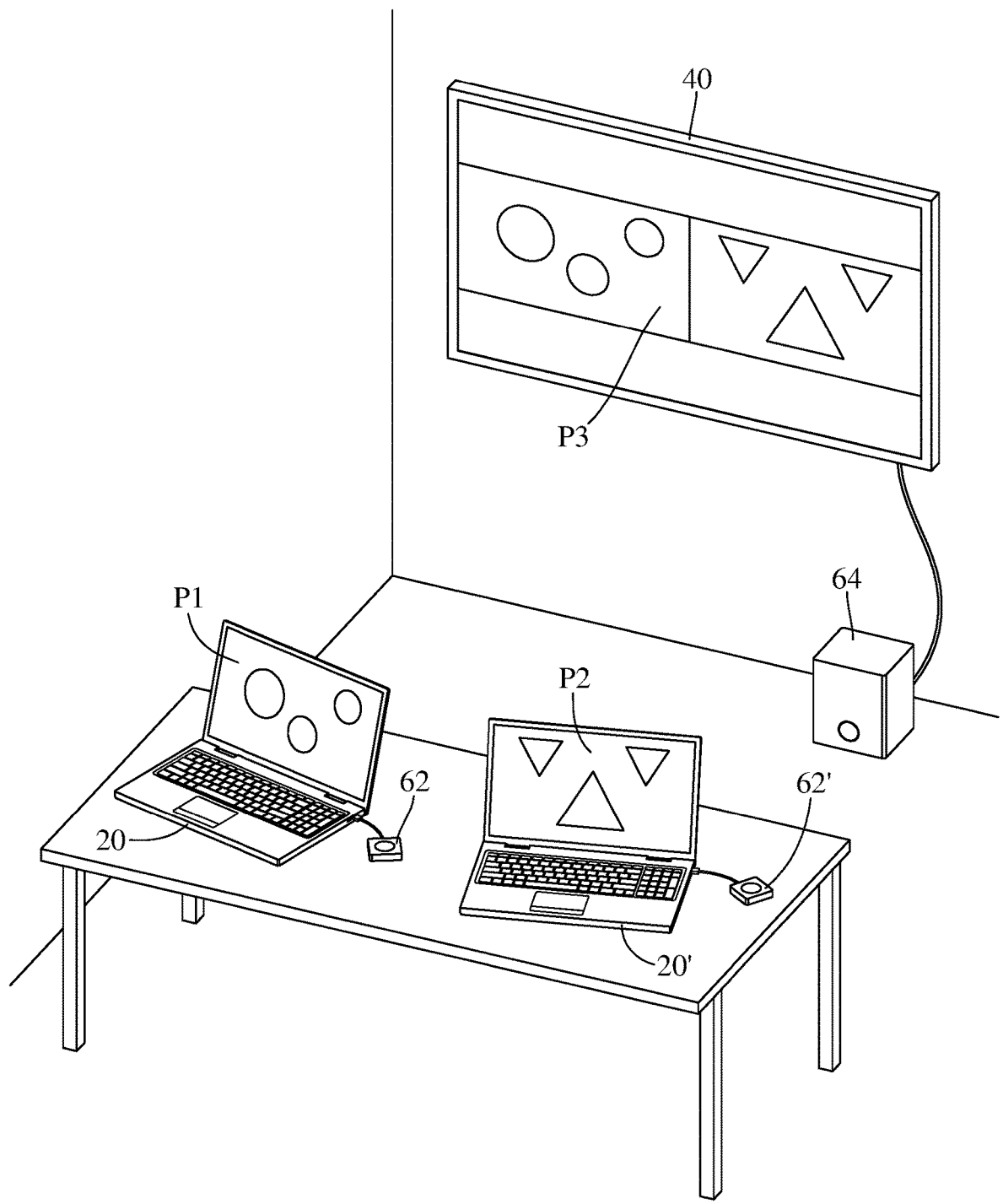
FIG. 2 is a schematic diagram of the usage scenario of the image display system capable of remote screenshot according to an embodiment of the present disclosure.

Please refer to FIG. 2, which illustrates a schematic diagram of the usage scenario of the image display system 100 capable of remote screenshot according to an embodiment of the present disclosure. As shown in FIG. 2, the image display system 100 capable of remote screenshot comprises two electronic devices 20 and 20', two senders 62 and 62', a receiver 64, and a display device 40. The electronic device 20 comprises a monitor to show the image P1. The electronic device 20' comprises a screen to show the image P2. The display device 40 receives image signals sent from two senders 62 and 62' through the receiver 64, and shows the two images P1 and P2 of the two electronic devices 20 and 20' in an image with a form of left-right splits, as P3 shown in FIG. 2. In this usage scenario, the user of any electronic device (such as the electronic device 20) may generate a capturing instruction by the trigger circuit 621 at any time, and obtain the captured image returned by the receiver 64 at his own electronic device 20 in a manner of accessing to a USB flash drive, wherein the captured image is the image of screen shown by the display device 40 when the receiver 64 receives the capturing instruction. The captured image further comprises annotations drawn by the user on the display device 40 when the display device 40 is a touch panel. Therefore, the participant may execute a screenshot of the shown images as well as any annotation during the conference at any time without leaving his own electronic device 20.

Figure 3:
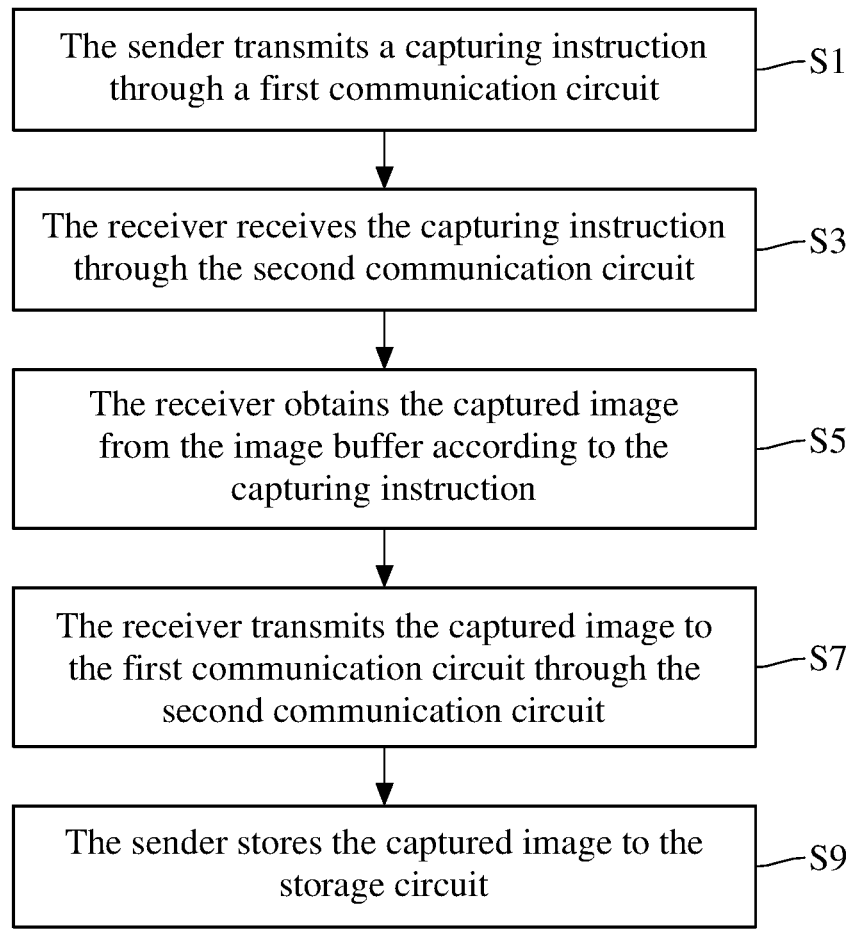
FIG. 3 is a flowchart of a remote screenshot method according to an embodiment of the present disclosure.

Please refer to FIG. 3 and FIG. 1B. FIG. 3 illustrates a flowchart of a remote screenshot method according to an embodiment of the present disclosure.

Please refer to step S1, the sender 62' transmits a capturing instruction through a first communication circuit 623'. Practically, before the sender 62' transmits a capturing instruction through a first communication circuit 623', step S1 further comprises electrically connecting the sender 62' to the electronic device 20' through a transmission interface (such as USB type-C) so that the user may generate the capturing instruction by the electronic device 20' or generate the capturing instruction by the trigger circuit 621' of the sender 62'.

Please refer to step S3, the receiver 64' receives the capturing instruction through the second communication circuit 643'. For example, the first and second communication circuit 623' and 643' have wireless connection to each other via Wi-Fi. However, the present disclosure does not limit the type of wireless communication of the first and second communication circuit 623' and 643'.

Please refer to step S5, the receiver 64' obtains the captured image from the image buffer 641' according to the capturing instruction and the captured image relates to the image signal shown by the display device 40'. The captured image may be a single image or a composite image. Practically, the encoding circuit 647' of the receiver 64' converts the first file format of the captured image into the second file format, after obtaining the captured image. For example, the RAW file is converted into the JPEG file or PNG file, so that the size of the converted captured image may be smaller than that of the original captured image.

Please refer to step S7, the receiver 64' transmits the captured image to the first communication circuit 623' through the second communication circuit 643'. Practically, after the encoding circuit 647' finishes the conversion, the receiver 64' sends the captured image with the second file format to the first communication circuit 623'.

Please refer to step S9, the sender 62' stores the captured image to the storage circuit 625' of the receiver 64'. Practically, after the sender 62' stores the captured image to the storage circuit 625', the user may access the captured image of the storage circuit 625' of the sender 62' through the electronic device 20'.

In view of above, the present disclosure creates a path for remote screenshot executed via the conventional structure of wireless projection. When the user would like to capture the image of the screen shown on the display device electrically connecting to the receiver, the user only needs to press the button of the wireless projection device (or transmit a capturing instruction by the electronic device), and then the sender and receiver can be driven to finish the screenshot operation. When there is a requirement of making a conference record or capturing an image shown, the user may access to the captured image via his own electronic device without moving to and operating the receiver, so that the conference would not be interfered. The user can operate at local site and record key data at any time. Furthermore, the recorded information operated by the user at local site may comprise information shared by all participants (multi-window) and conference annotations.

What is claimed is:

1. An image transmission device adapted to electrically connect to an electronic device and a display device comprising:
    a sender comprising:
        a trigger circuit configured to generate a capturing instruction;
        a first communication circuit electrically connecting to the trigger circuit and configured to send an image signal outputted by the electronic device, send the capturing instruction and receive a captured image; and
        a storage circuit configured to store the captured image and having a transmission interface configured to electrically connect to the electronic device to transmit the captured image; and
    a receiver comprising:
        a second communication circuit communicably connecting to the first communication circuit and configured to receive the image signal, receive the capturing instruction and send the captured image;
        an image buffer electrically connecting to the second communication circuit and configured to temporarily store the image signal shown by the display device; and
        a control circuit electrically connecting to the second communication circuit and the image buffer and configured to obtain the captured image from the image buffer according to the capturing instruction and control the second communication circuit to send the captured image;
    wherein the sender electrically connects to the electronic device with the transmission interface to receive the image signal, the sender is implemented with a computer dongle connected to the electronic device through a USB type-C connector, and
    after the sender stores the captured image in the storage circuit, the sender sends the captured image to the electronic device through the transmission interface.

2. The image transmission device of claim 1, wherein the receiver further comprises a encoding circuit electrically connecting to the image buffer and the control circuit; the encoding circuit convert a first file format of the captured image into a second file format, a size of the captured image with the second file format is smaller than a size of the captured image with the first format, and the control circuit controls the second communication circuit to send the captured image with the second file format.

3. An image display system capable of remote screenshot comprising:
   an electronic device outputting an image signal;
   a display device having a display panel showing an image of a screen, with the image of the screen being associated with the image signal; and
   the image transmission device of claim 1 electrically connecting to the electronic device and the display device.

4. The image display system capable of remote screenshot of claim 3, wherein the display device further comprises an input circuit configured to generate an annotation layer attached to the image of the screen, and the control circuit of the receiver of the image transmission device is further configured to update the image signal temporarily stored by the image buffer of the receiver of the image transmission device according to the annotation layer.

* * * * *